March 15, 1932.    C. KIBBE    1,849,235
HELICOPTER
Filed Sept. 23, 1930    Sheets-Sheet 1

INVENTOR
C. Kibbe
BY
ATTORNEY

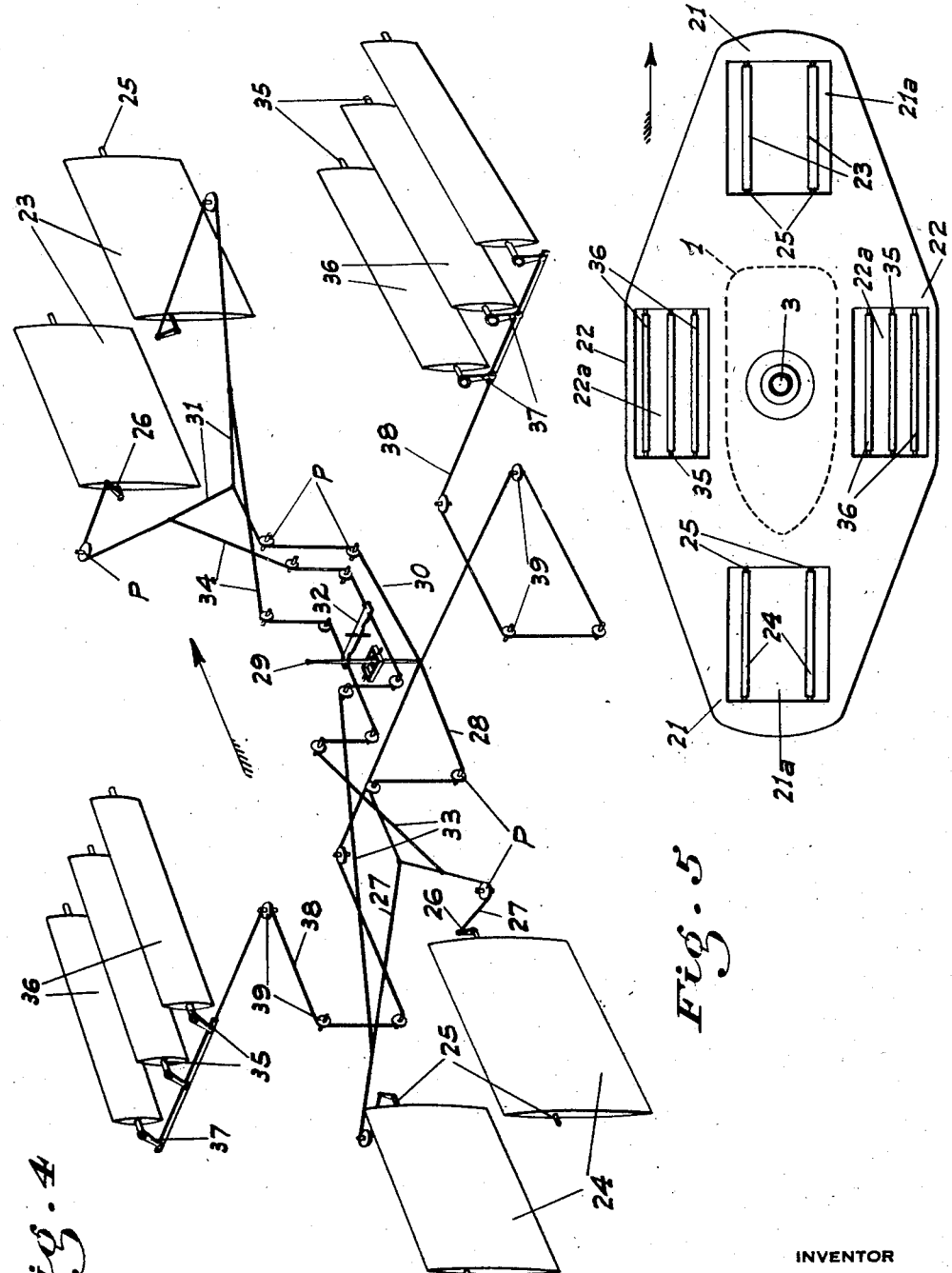

Patented Mar. 15, 1932

1,849,235

UNITED STATES PATENT OFFICE

CLIFFORD KIBBE, OF TRACY, CALIFORNIA

HELICOPTER

Application filed September 23, 1930. Serial No. 483,803.

This invention relates to flying machines of the helicopter or vertical ascending and descending type.

The major object of my invention is to provide what I believe to be a novel mounting and driving arrangement for the supporting wings or propellers of the helicopter, so that there is no tendency for the fuselage or car of the helicopter to rotate and which also avoids complicated connections between the propellers and the power plant.

Another object is to provide a novel arrangement for controlling the direction of flight, both horizontally and vertically, of the helicopter, so as to normally offer a minimum of resistance to the various air currents set up with the vertical or horizontal movement of the airplane.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 4 is a diagrammatic perspective view of the direction control structure of the helicopter.

Fig. 5 is a top plan view of the body structure of the helicopter showing the direction controlling shutters and their supporting frame.

Figure 1:
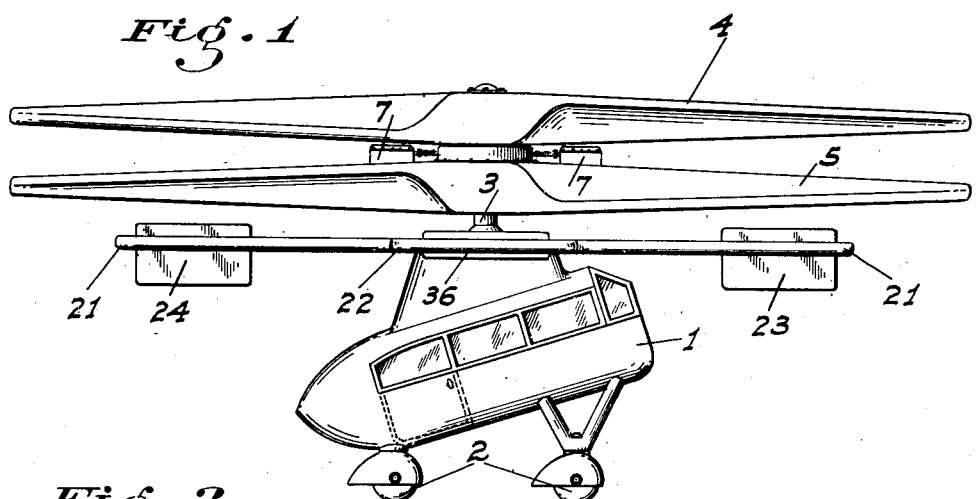
Fig. 1 is a side view of my improved helicopter as in position when on the ground.
Figure 2:
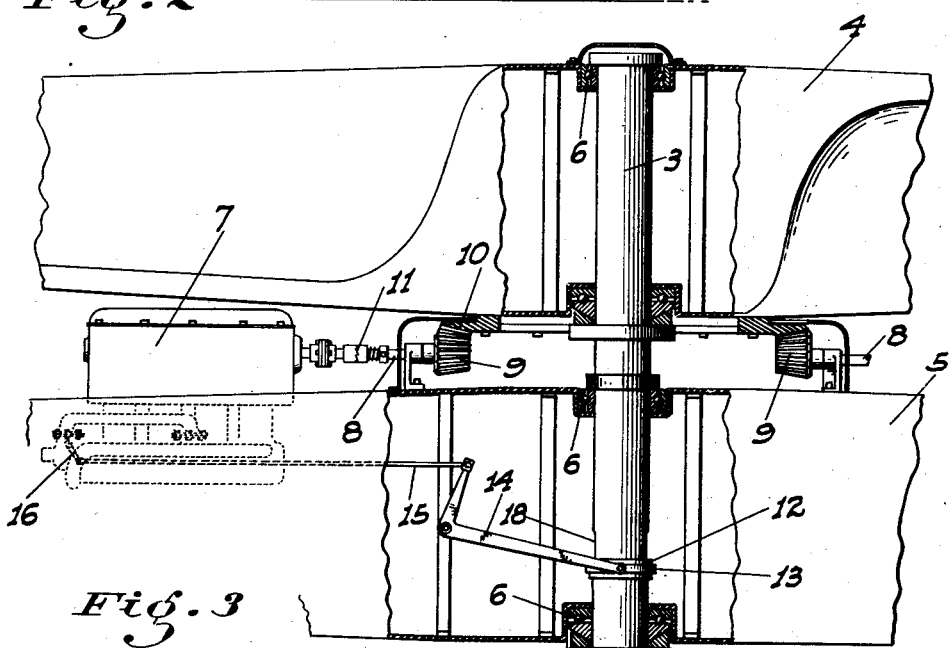
Fig. 2 is an enlarged fragmentary section of the helicopter propellers and their driving means.
Figure 3:
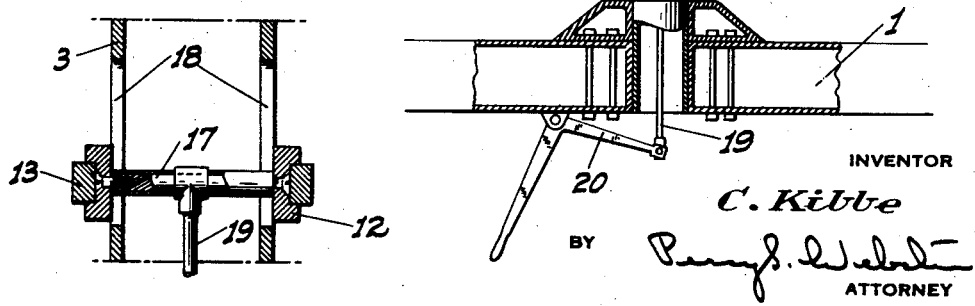
Fig. 3 is a fragmentary section showing the control means for the engine throttle or similar adjustable part.

Referring now more particularly to the characters of reference on the drawings, the numeral 1 denotes the cabin or body of the helicopter which is supported from the ground by front and rear caster type wheels 2 in such a manner that the body has a considerable upward slope toward its forward end when the wheels engage the ground. Rigidly secured to and projecting upwardly from the top of the body is a stiff tubular post 3 which is disposed at an angle to the body in a longitudinal plane so that the post is vertical when the wheels are on the ground.

Turnably and independently mounted on the post in vertically spaced relation to each other are upper and lower supporting wings 4 and 5 respectively. These wings are formed as large propellers having two or more blades, the pitch of the blades of the two propellers being arranged so that they will exert a vertical lifting effect on the airplane even though they are turning in opposite directions as they are intended to do in order to give a balanced action. The propellers being large are preferably hollow built-up structures, having skeleton frames of suitable design covered by sheeting of fabric or other material. These propellers are mounted on annular and thrust bearings 6 of the ball or other anti-friction type, so that they will turn freely about the post.

Mounted on the lower propeller in diametrically opposed relation to each other are power plants 7 which are preferably gas engines. The engines may be partly depressed in the interior of the propeller blades, but in any event are arranged so that their drive shafts 8 project above the top surface of the lower propeller. The said engines are disposed so that their drive shafts are radial relative to the post, and each carries a bevel pinion 9 on its outer end which engages a bevel gear 10 secured to the under surface of the upper propeller concentric with the post. The shafts 8 preferably have overrunning clutches therein conventionally shown at 11, besides the ordinary clutches which they may have. Such overrunning clutches take care of possible variations in the speed of the two engines, which are both connected to the one gear, without any harmful effects being possibly had.

By means of the above described driving arrangement, the upper propeller will be positively driven in one direction, while the reaction of the driving pinions causes the tower propeller to rotate in the opposite direction and of course at the same speed.

The engines being mounted in the rotatable propeller rather than in the body itself, as is usually the case, there is no tendency for the reactionary force of the engines to tend to rotate the body.

Since the engines of course must be controlled from the interior of the body, which is stationary relative to the engines, it is necessary to provide a special form of mechanism for operating the various adjustable or control features of the engines. As an illustration of such mechanisms I have shown the throttle control means only, since the same type of control may be used for the other features as well. This control mechanism comprises a collar 12 slidable on the post between the top and bottom surfaces of the lower propeller, and engaged by a ring 13 which is turnable therein. This ring is engaged by the fork on one end of a bell-crank 14 which is disposed within the lower propeller and is pivoted on one of the frame members thereof. The other end of the bell-crank is connected by a rod 15 or the like, with the throttle arm of the engine. Sliding the collar up and down the post therefore causes the throttle arm to be moved from one position to another regardless of the rotation of the ring relative to the collar. The collar is thus slid by means of a cross bar 17 extending across and connected to the collar and movable in vertical opposed slots 18 in the post. A rod 19 engages and depends from said bar to a point inside the body 1 at which end it is connected to an operating arm or lever, as indicated at 20. The distance between the top and bottom bearings of the propeller and the diameter of the post are sufficient to enable the necessary movement of separate collars and associated control members, to be mounted, as may be required.

While I have described the engines as being mounted on the lower propeller only, in more powerful models additional engines may also be mounted on the upper propeller, with of course appropriate gearing on other drive connections.

A normally horizontal frame 21 is fixed in connection with the body on top of the same and under the propellers and is arranged so that it has front and rear portions 21 projecting some distance beyond the corresponding ends of the body and side portions 22 projecting outwardly of the sides of the body. These frame portions 21 and 22 surround or form substantially rectangular openings 21a and 22a respectively. Pivoted on the frame portions 21 on axes extending longitudinally of the airplane are front and rear pairs of shutters 23 and 24. These shutters are disposed in the corresponding openings of the frame, and their area is sufficient to substantially cover the openings when the shutters are horizontal or closed. The pivotal trunnions 25 of the shutters are disposed toward their opposite or outer sides and horns 26 project radially from the trunnions. The horns of the rear shutters are connected by cables 27 to a common cable 28 which in turn is connected with the lower end of a control stick 29. This stick is mounted in the pilot's compartment of the body for universal swivel movement as usual. The horns of the front pair of shutters are also connected to the stick by a cable 30 extending forwardly from the lower end of the stick and from which branch cables 31 extend to said horns. Since the stick is on a different level from the shutters the various cables pass over suitably arranged direction changing pulleys P, and it is to be understood that the showing of the cables and the arrangement of the pulleys in Fig. 4 is diagrammatic only for the sake of clarity, without any attempt having been made to show the stick or the cables in their actual relationship to the shutters.

The pairs of shutters and the control cables are arranged so that when the front shutters are both fully closed (or horizontal) the rear shutters are both fully open (or vertical) and vice versa; both pairs of shutters being normally open when the helicopter is in forward flight.

Simultaneous movement of either pair of these shutters by the manipulation of the stick without affecting the other pair controls the up and down tilting or steering of the airplane in a longitudinal vertical plane. Steering of the airplane to the right or left in a horizontal direction is also accomplished by the shutters by additional control means applied thereto as follows:

Mounted in the pilot's compartment of the body in proximity to but separate from the stick is a transversely extending foot-bar 32 which is pivoted centrally between its ends on a vertical axis. Cables 33 extend rearwardly from this bar on opposite sides of its pivot to connections with the cables 27 of the rear shutters 24 but in crossing relation; or so that the cable attached to the right-hand side of the foot-bar is connected to the cable of the left-hand shutter, and vice versa.

Similarly cables 34 extend forwardly from the bar on opposite sides of its pivot, and are connected to the cables 31 of the front shutters 23 in crossing relation. By means of this arrangement it will be seen that the movement of the foot-bar in one longitudinal direction or the other causes one of the rear shutters to be partially closed (or to an angle of 45 degrees) and the front shutter on the opposite side to be opened and vice versa, without affecting the other shutters.

This forms a wind-mill like device, and a horizontal turning movement is thus imparted to the helicopter to one side or the other, since the affected shutters are disposed on opposite sides of the longitudinal center line of the helicopter.

Banking or sidewise tilting of the helicopter is also controlled from the stick in the following manner: Pivoted in the frame portions 22 on trunnions 35 which extend longitudinally of the airplane, are a plurality of shutters 36, which are disposed in the corresponding openings 22a and are arranged when lying horizontally to completely close said openings. The shutters on both sides are normally all vertically disposed (and open) at the same time. Horns 37 are secured to the trunnions 35 of all these shutters, separate cables 38 being connected in common to all the horns of the shutters on opposite sides, and extend thence laterally to connections with the lower end of the stick on opposite sides of the same, said cables passing over suitable arranged direction changing pulleys 39. These pulleys, just as mentioned in connection with the pulleys P, are shown diagrammatically rather than in their actual relation to the perspective parts. By means of the above arrangement it will be seen that only one set of shutters is affected at a time by the sidewise swinging of the stick, and such movement of the stick does not affect the front and rear shutters 23 and 24 unless an additional longitudinal swinging movement is imparted to the stick.

When the desired flying altitude has been attained the front and rear shutters are set by proper manipulation of the stick so that the wings or propellers are forwardly inclined, and the body is substantially horizontal. The helicopter would then progress like a glider, tendency to loss of altitude however being taken care of by the ascending action imparted to the machine by the rotating propellers or air screws. The various shutters are always disposed on edge to the direction of longitudinal travel and most of them are normally on edge to a vertical direction of movement. This arrangement offers a minimum of resistance to the movement of the helicopter and of course tends to cause the shutters to remain in such positions due to the action of the horizontal or vertical air currents thereon.

It is to be noted that the control cables, from the stick to both the side and end shutters, are arranged so that only one set of side or end shutters is moved at a time, the air pressure normally holding the other shutters open even though the corresponding cables are slack.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a helicopter having a body, a tubular post projecting upwardly therefrom and rigid therewith, a supporting propeller turnably mounted on the post, and an engine mounted on the propeller and arranged to impart rotation thereto and to rotate therewith; a means for controlling an adjustable part of the engine from the interior of the body, said means comprising a collar slidably but non-turnably mounted on the post, said post having a vertical slot, a member rigid with the collar and projecting through the slot to the interior of the post, an operating rod connected to and depending from said member to the interior of the body whereby the vertical movement of the collar may be controlled, a ring turnable on the collar, and connections between said ring and the adjustable engine part to adjust the latter with the vertical movement of the collar and ring.

2. In a flying machine, a body, a horizontal frame rigid with and projecting outwardly from the body and provided with front and rear openings disposed in a horizontal plane beyond the ends of the body, pairs of shutters pivoted on the frames within said openings on axes longitudinally of the airplane, the shutters in both openings being both normally vertical and open, and manually operable to move either pair of shutters to a closed position.

3. A structure as in claim 2, with separate manually operable means for adjusting the setting of opposite ones of the shutters simultaneously without affecting the remaining shutters and without affecting the first named manually operable means.

In testimony whereof I affix my signature.

CLIFFORD KIBBE.